United States Patent
Park et al.

(10) Patent No.: US 10,952,239 B2
(45) Date of Patent: Mar. 16, 2021

(54) METHOD FOR TRANSMITTING/RECEIVING UPLINK SIGNAL AND DEVICE SUPPORTING SAME IN WIRELESS COMMUNICATION SYSTEM SUPPORTING UNLICENSED BAND

(71) Applicant: LG ELECTRONICS INC., Seoul (KR)

(72) Inventors: Hanjun Park, Seoul (KR); Joonkui Ahn, Seoul (KR); Seonwook Kim, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/073,615

(22) PCT Filed: Jan. 26, 2017

(86) PCT No.: PCT/KR2017/000972
§ 371 (c)(1),
(2) Date: Jul. 27, 2018

(87) PCT Pub. No.: WO2017/131478
PCT Pub. Date: Aug. 3, 2017

(65) Prior Publication Data
US 2019/0014594 A1   Jan. 10, 2019

Related U.S. Application Data

(60) Provisional application No. 62/288,452, filed on Jan. 29, 2016, provisional application No. 62/291,482, filed on Feb. 4, 2016.

(51) Int. Cl.
*H04W 16/14* (2009.01)
*H04W 74/08* (2009.01)
(Continued)

(52) U.S. Cl.
CPC ......... *H04W 74/004* (2013.01); *H04W 16/14* (2013.01); *H04W 74/006* (2013.01); *H04W 74/0808* (2013.01); *H04W 88/06* (2013.01)

(58) Field of Classification Search
CPC . H04L 5/0041; H04L 5/0098; H04L 27/0006; H04W 16/14; H04W 72/0453;
(Continued)

(56) References Cited

U.S. PATENT DOCUMENTS

| 8,594,120 B2 | 11/2013 | Mangold et al. |
| 2007/0072638 A1 | 3/2007 | Yang et al. |

(Continued)

FOREIGN PATENT DOCUMENTS

| WO | WO 2015/168028 A1 | 11/2015 |
| WO | WO 2016/003674 A1 | 1/2016 |

OTHER PUBLICATIONS

Broadcom Corporation, "Alternatives for LAA LBT Energy Detection Threshold Adaptation", R1-152939, 3GPP TSG RAN WG1 Meeting #81, Fukuoka, Japan, May 25-29, 2015, XP050970032, 4 pages.
(Continued)

*Primary Examiner* — Harun Chowdhury
(74) *Attorney, Agent, or Firm* — Birch, Stewart, Kolasch & Birch, LLP

(57) ABSTRACT

Disclosed are a method for transmitting/receiving an uplink signal between a terminal and a base station and a device supporting same in a licensed assisted access (LAA) system in which the base station or the terminal executes listen-before-talk (LBT)-based signal transmission. Specifically, disclosed are: a method for a terminal transmitting an uplink signal by executing an uplink LBT operation which is based on LBT-related information if the base station provides the
(Continued)

LBT-related information for the uplink LBT operation of the terminal; and a device supporting same.

6 Claims, 14 Drawing Sheets

(51) Int. Cl.
  *H04W 74/00* (2009.01)
  *H04W 88/06* (2009.01)
(58) Field of Classification Search
  CPC ............. H04W 74/0808; H04W 88/06; H04W 74/004; H04W 74/006; H04W 74/08
  USPC ..................... 370/252, 329, 331; 455/552.1
  See application file for complete search history.

(56) References Cited

U.S. PATENT DOCUMENTS

| | | |
|---|---|---|
| 2013/0017794 A1 | 1/2013 | Kloper et al. |
| 2013/0208587 A1 | 8/2013 | Bala et al. |
| 2015/0296370 A1 | 10/2015 | Kim et al. |
| 2017/0118771 A1* | 4/2017 | Kazmi .............. H04W 74/0808 |
| 2017/0164403 A1* | 6/2017 | Lindheimer .......... H04W 74/08 |
| 2018/0376339 A1* | 12/2018 | Hu ........................ H04W 16/14 |

OTHER PUBLICATIONS

Cisco Systems, "Remaining Details of DL LBT Procedure of Rel-13 LAA", R1-155150, 3GPP TSG RAN WG1 #82bis, Malmo, Sweden, Oct. 5-9, 2015, XP051039587, 6 pages.

Ericsson, et al., "WF on ED adaptation," R1-154970, 3GPP TSG RAN WG1 #82, Beijing, China, Aug. 24-28, 2015, XP051045054, 3 pages.

HTC, "Discussion on Adaptaion Rules of the Maximum Energy Detection Threshold in LAA Coexistence", R1-157281, 3GPP TSG RAN WG1 Meeting #83, Anaheim, USA, Nov. 15-22, 2015, XP051003485, 4 pages.

\* cited by examiner (a)

15.1.4 Energy Detection Threshold Adaptation Procedure

An eNB accessing a channel on which LAA Scell(s) transmission(s) are performed, shall set the energy detection threshold ($X_{Thresh}$) to be less than or equal to the maximum energy detection threshold $X_{Thresh\_max}$.

$X_{Thresh\_max}$ is determined as follows:

- If the absence of any other technology sharing the carrier can be guaranteed on a long term basis (e.g. by level of regulation) then:

- $$X_{Thresh\_max} = \min \begin{cases} T_{max} + 10dB, \\ X_r \end{cases}$$

- $X_r$ is Maximum energy detection threshold defined by regulatory requirements in dBm when such requirements are defined, otherwise $X_r = T_{max} + 10\,dB$

- Otherwise,

- $$X_{Thresh\_max} = \max \begin{cases} -72\,dBm\ (20\text{MHz}), \\ \min \begin{cases} T_{max}, \\ T_{max} - T_A + (P_H - P_{TX}) \end{cases} \end{cases}$$

- Where:

- $T_A = 10\text{dB}$ for transmission(s) including PDSCH;

- $T_A = 5\text{dB}$ for transmissions including discovery signal transmission(s) and not including PDSCH

- $P_H = 23\,\text{dBm}$,

- $P_{TX}$ is the set maximum eNB output power in dBm for the carrier

- eNB uses the set maximum transmission power over a single carrier irrespective of whether single carrier or multi-carrier transmission is employed.

- $T_{max}(\text{dBm}) = 10 \cdot \log 10 \left( 3.16228 \cdot 10^{-8} (mW / MHz) \cdot BWMHz\,(MHz) \right)$

- BWMHz is the single channel bandwidth in MHz

METHOD FOR TRANSMITTING/RECEIVING UPLINK SIGNAL AND DEVICE SUPPORTING SAME IN WIRELESS COMMUNICATION SYSTEM SUPPORTING UNLICENSED BAND

CROSS REFERENCE TO RELATED APPLICATIONS

This application is the National Phase of PCT International Application No. PCT/KR2017/000972, filed on Jan. 26, 2017, which claims priority under 35 U.S.C. 119(e) to U.S. Provisional Applications No. 62/288,452, filed on Jan. 29, 2016 and No. 62/291,482 filed on Feb. 4, 2016, all of which are hereby expressly incorporated by reference into the present application.

TECHNICAL FIELD

Following description relates to a wireless communication system supporting an unlicensed band, and more particularly, to a method of transmitting and receiving an uplink signal between a user equipment and a base station in a wireless communication system supporting an unlicensed band and apparatuses supporting the method.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

When a UE performs LBT (listen-before-talk)-based uplink signal transmission, an object of the present invention is to provide a method for the UE to transmit an uplink signal by efficiently performing an LBT operation.

In particular, an object of the present invention is to specify a method for a base station to provide LBT-related information for an uplink operation of a UE and a method for the UE to efficiently transmit an uplink signal to the base station by efficiently performing uplink LBT based on the LBT-related information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention proposes a method of transmitting and receiving an uplink signal between a user equipment and a base station in a wireless communication system supporting an unlicensed band and apparatuses supporting the method.

To achieve these and other advantages and in accordance with the purpose of the present invention, as embodied and broadly described, according to one embodiment, a method of transmitting an uplink signal, which is transmitted by a user equipment (UE) to a base station in a wireless communication system supporting an unlicensed band, includes receiving information indicating an equation of calculating an energy detection threshold for an uplink listen before talk (LBT) operation from the base station and transmitting the uplink signal by performing uplink LBT based on the equation indicated by the received information. In this case, the received information can indicate the equation of calculating the energy detection threshold for the uplink LBT operation based on whether or not the unlicensed band is shared with a different communication technology.

To further achieve these and other advantages and in accordance with the purpose of the present invention, according to a different embodiment, a method of receiving an uplink signal, which is received by a base station from a user equipment (UE) in a wireless communication system supporting an unlicensed band, includes transmitting information indicating an equation of calculating an energy detection threshold for an uplink LBT operation to the user equipment and receiving the uplink signal from the user equipment, which has performed the uplink LBT operation based on the indicated equation of calculating the energy detection threshold. In this case, the transmitted information can indicate the equation of calculating the energy detection threshold for the uplink LBT operation based on whether or not the unlicensed band is shared with a different communication technology.

To further achieve these and other advantages and in accordance with the purpose of the present invention, according to a further different embodiment, a user equipment transmitting an uplink signal to a base station in a wireless communication system supporting an unlicensed band includes a receiver, a transmitter, and a processor configured to operate in a manner of being connected with the receiver and the transmitter, the processor configured to receive information indicating an equation of calculating an energy detection threshold for an uplink LBT operation from the base station, the processor configured to transmit the uplink signal by performing the uplink LBT based on the equation indicated by the received information. In this case, the received information can indicate the equation of calculating the energy detection threshold for the uplink LBT operation based on whether or not an unlicensed band is shared with the different communication technology.

To further achieve these and other advantages and in accordance with the purpose of the present invention, according to a further different embodiment, a base station receiving an uplink signal from a user equipment in a wireless communication system supporting an unlicensed band includes a receiver, a transmitter, and a processor configured to operate in a manner of being connected with the receiver and the transmitter, the processor configured to transmit information indicating an equation of calculating an energy detection threshold for an uplink LBT operation to the user equipment, the processor configured to receive the uplink signal from the user equipment, which has performed the uplink LBT operation based on the indicated equation of calculating the energy detection threshold. In this case, the transmitted information can indicate the equation of calculating the energy detection threshold for the uplink LBT operation based on whether or not the unlicensed band is shared with a different communication technology.

In this case, the first downlink control information can indicate a type of scheduling uplink signal transmission for the one or more subframes using an indicator of a size of 1 bit.

In this case, the information can indicate one of two equations based on whether or not the unlicensed band is shared with the different communication technology.

In this case, the different communication technology may include a Wi-Fi communication technology.

And, the information can be transmitted via a higher layer signaling or downlink control information (DCI).

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, a UE receives LBT parameter information to transmit an uplink signal to a base station and can perform UL LBT based on the LBT parameter information in a wireless access system supporting an unlicensed band.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 16 is a diagram for Energy Detection Threshold Adaptation Procedure.

BEST MODE

Mode for Invention

Figure 1:
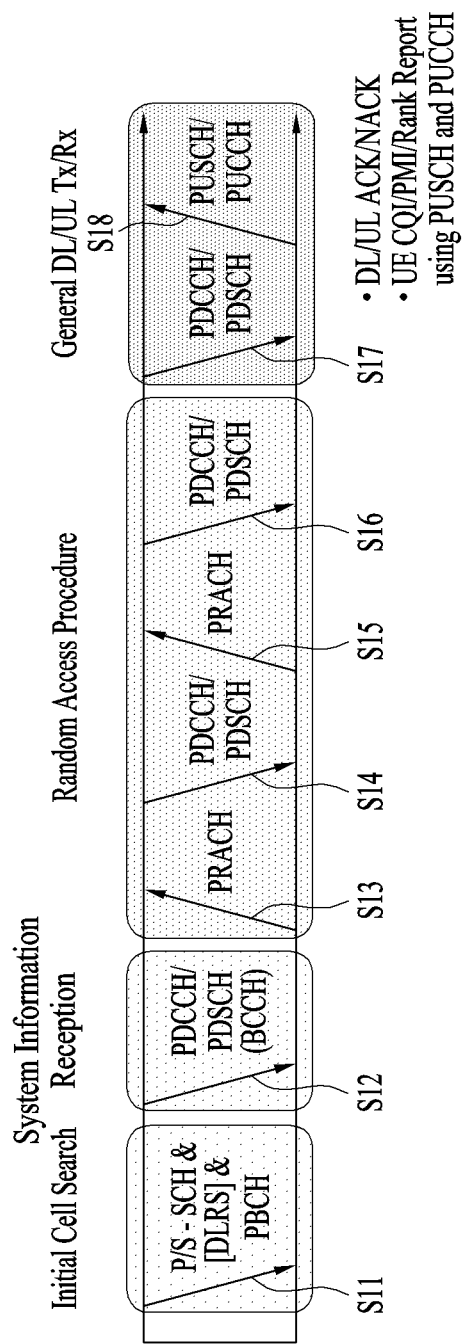
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), and CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PDCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
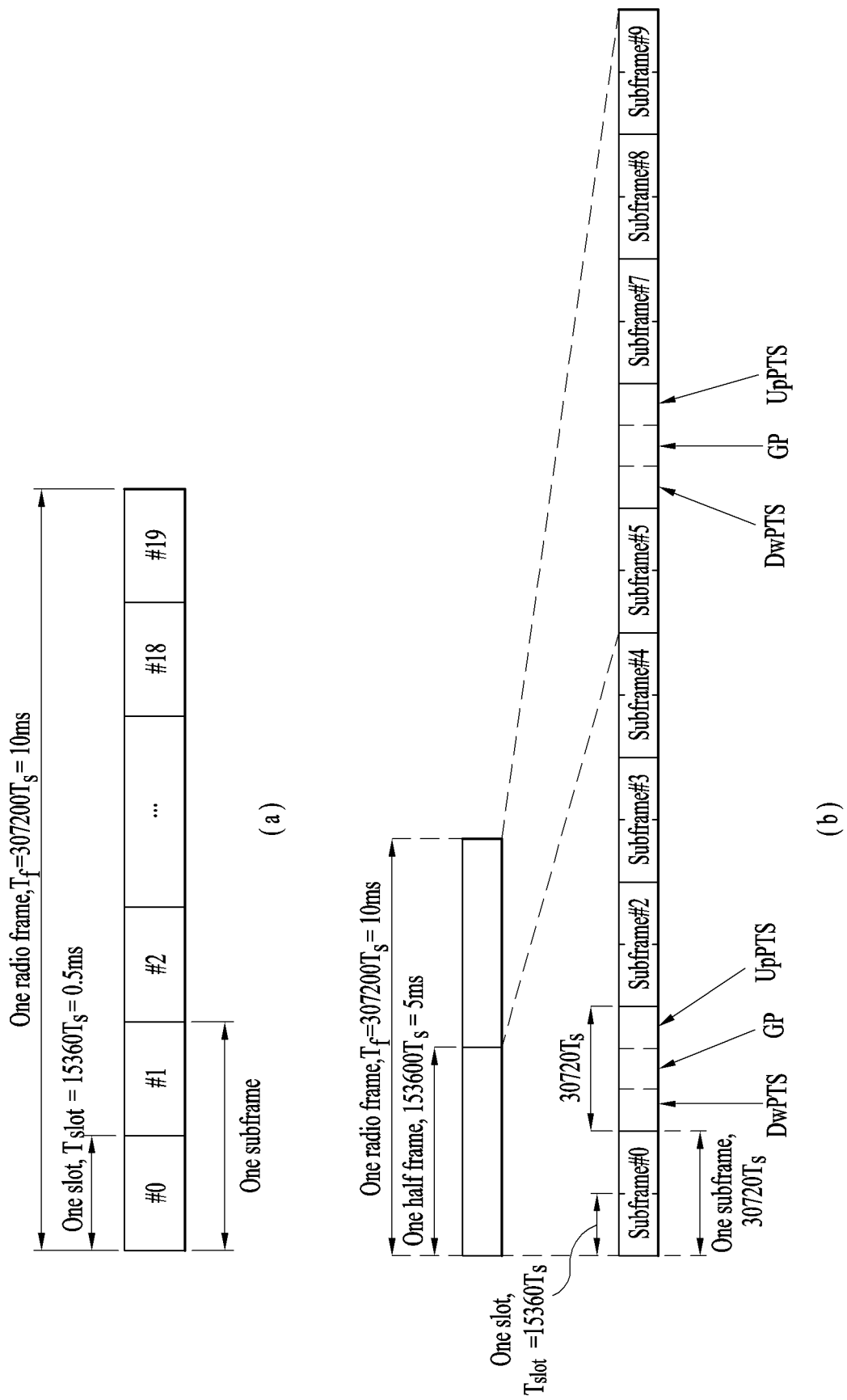
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
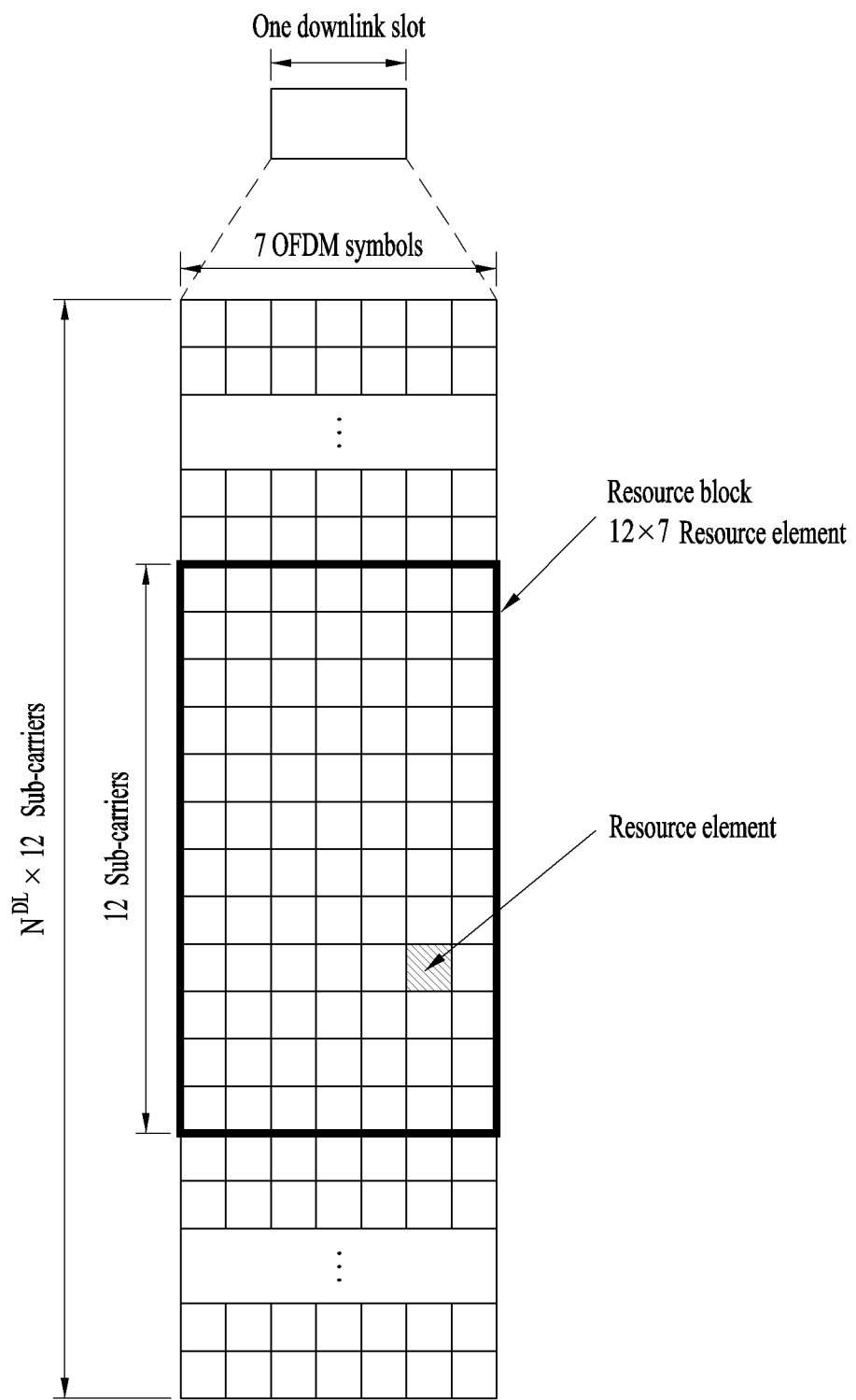
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
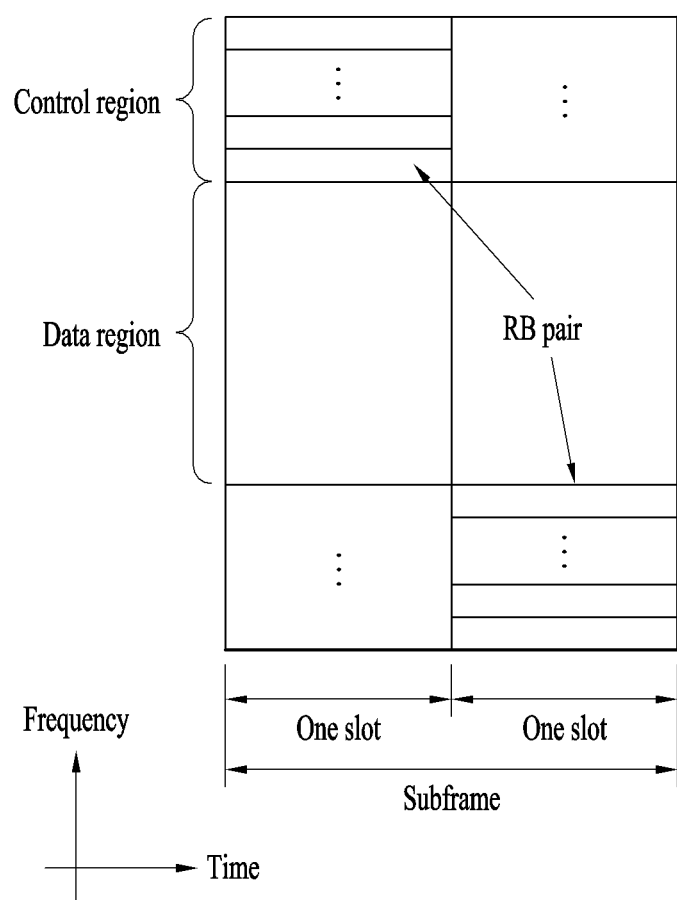
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
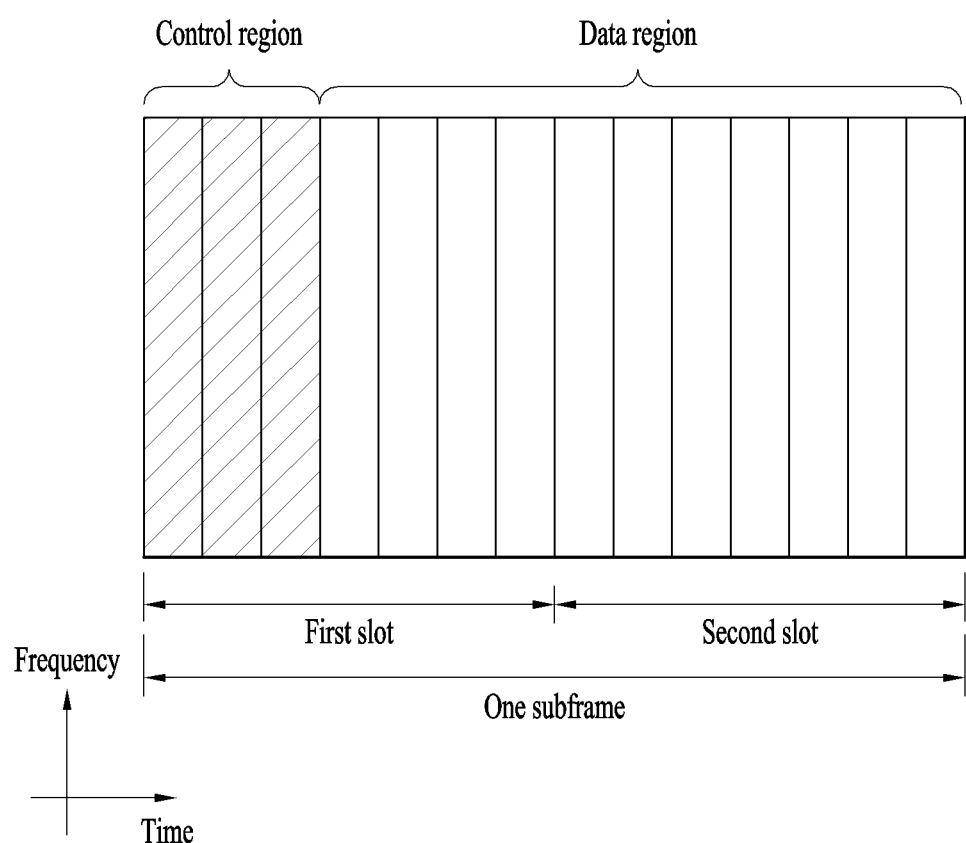
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
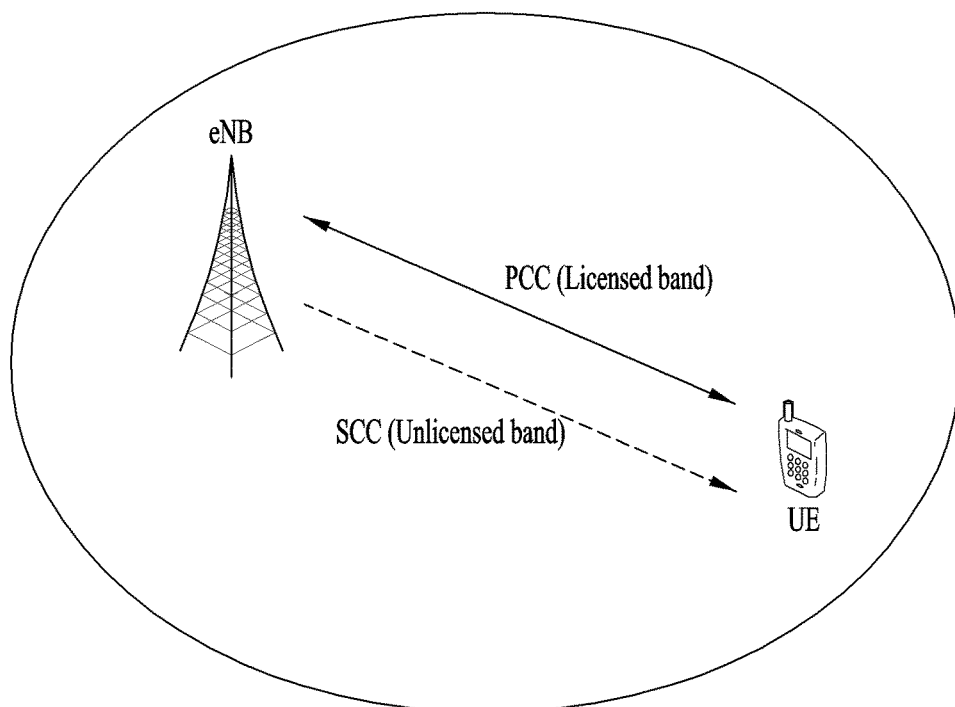
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
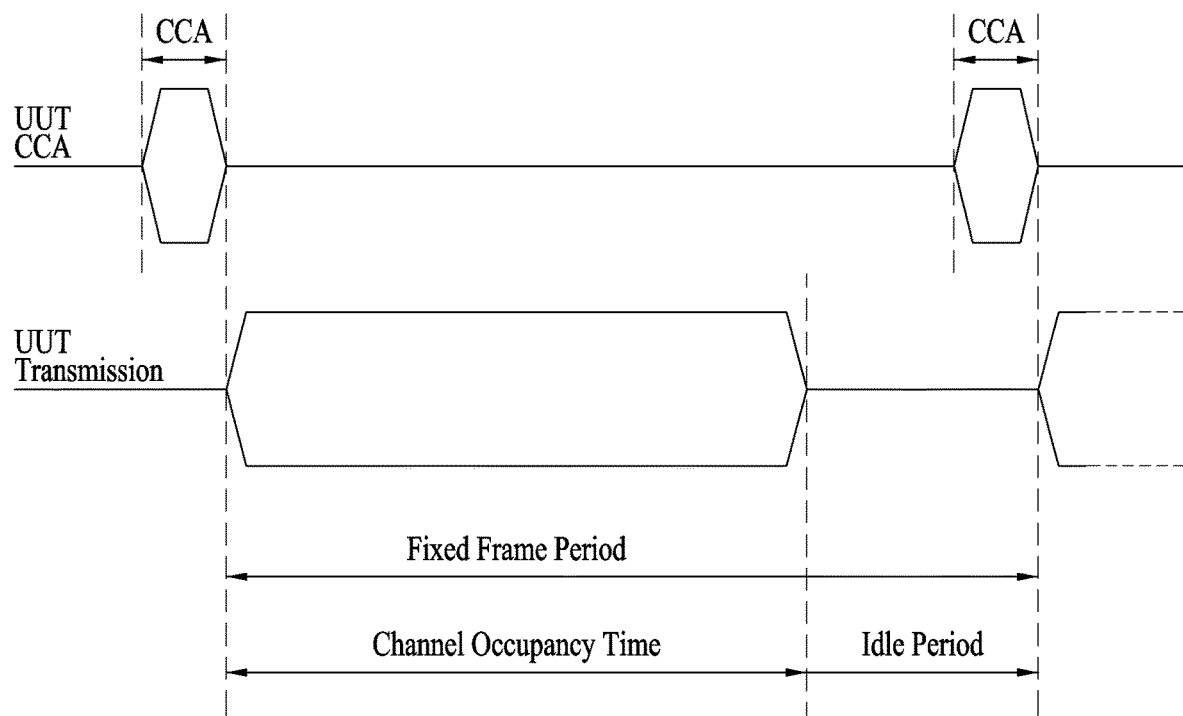
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
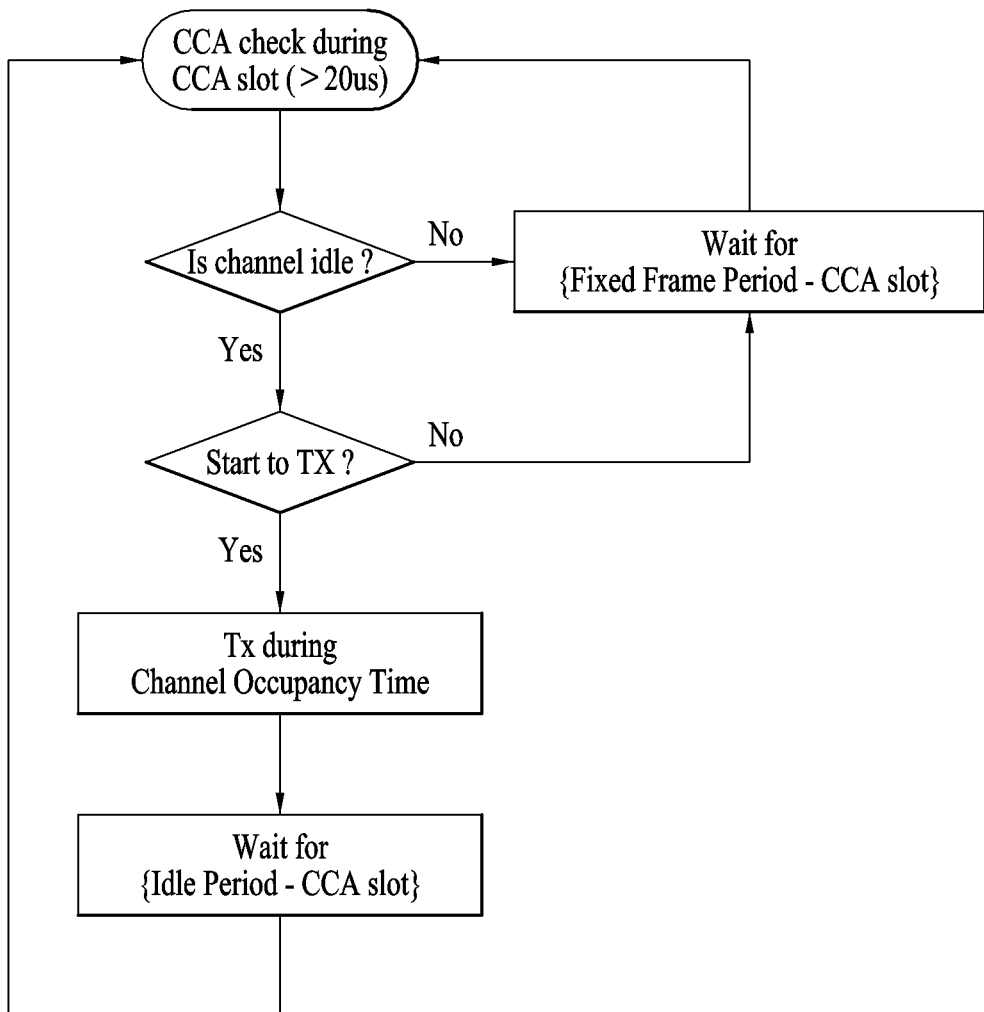
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

Figure 9:
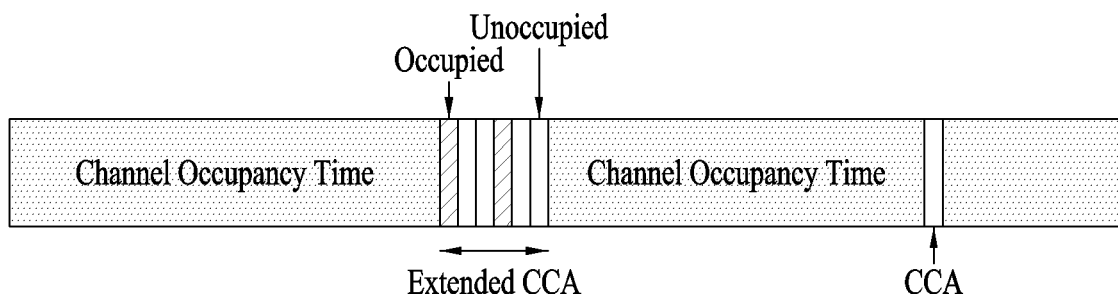
FIG. 9 is a diagram illustrating an exemplary Load Based Equipment (LBE) operation as one of the LBT operations.
Figure 9:
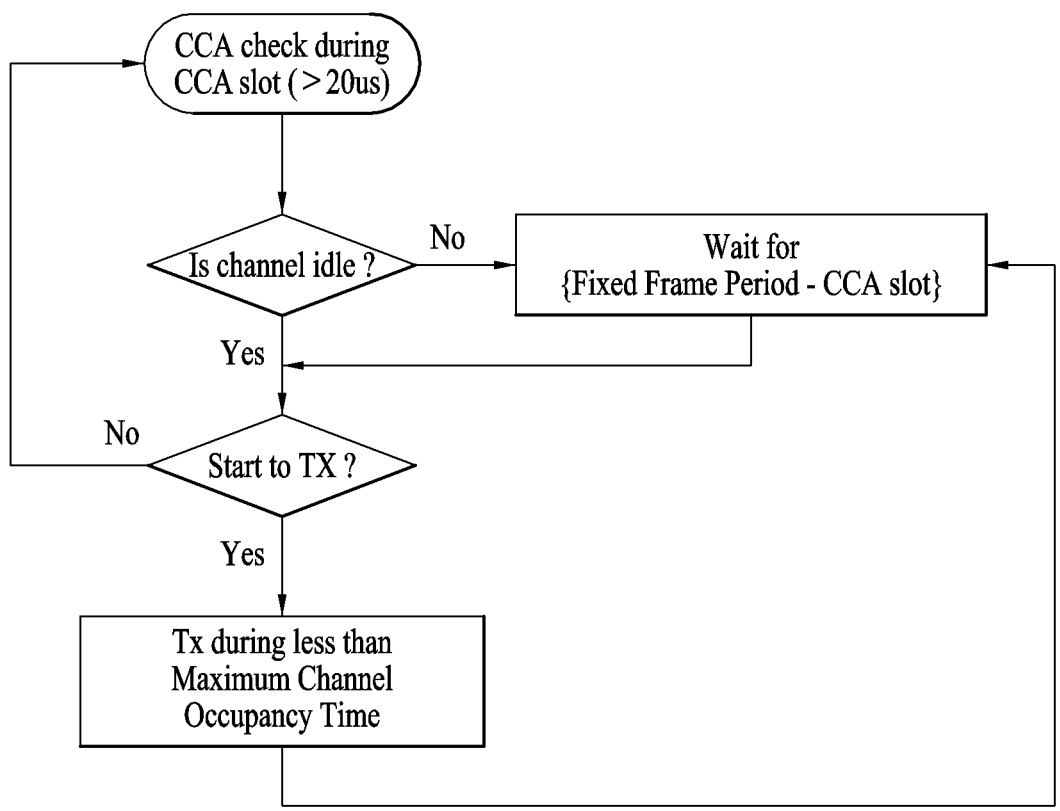

FIG. 9 is a view illustrating an exemplary LBE operation as one of the LBT operations.

Referring to FIG. 9(a), in LBE, the communication node first sets q (q ∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N∈{1, 2, ..., q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
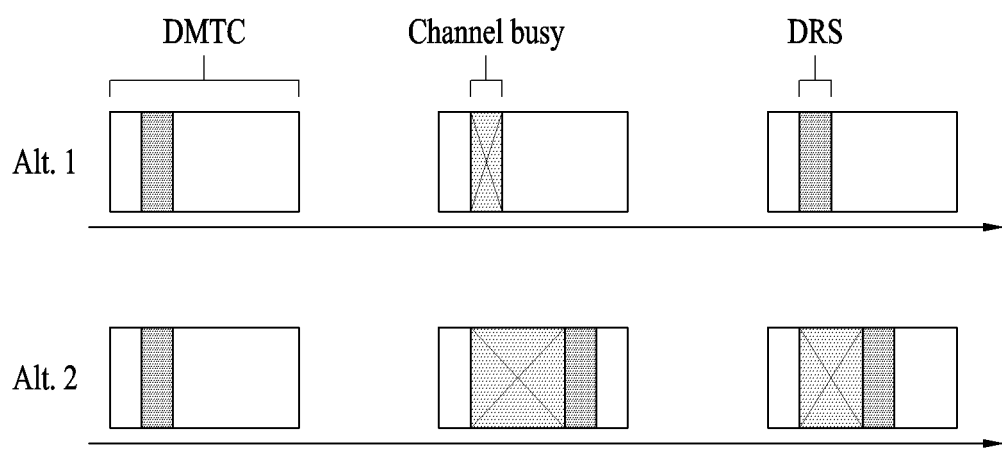
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
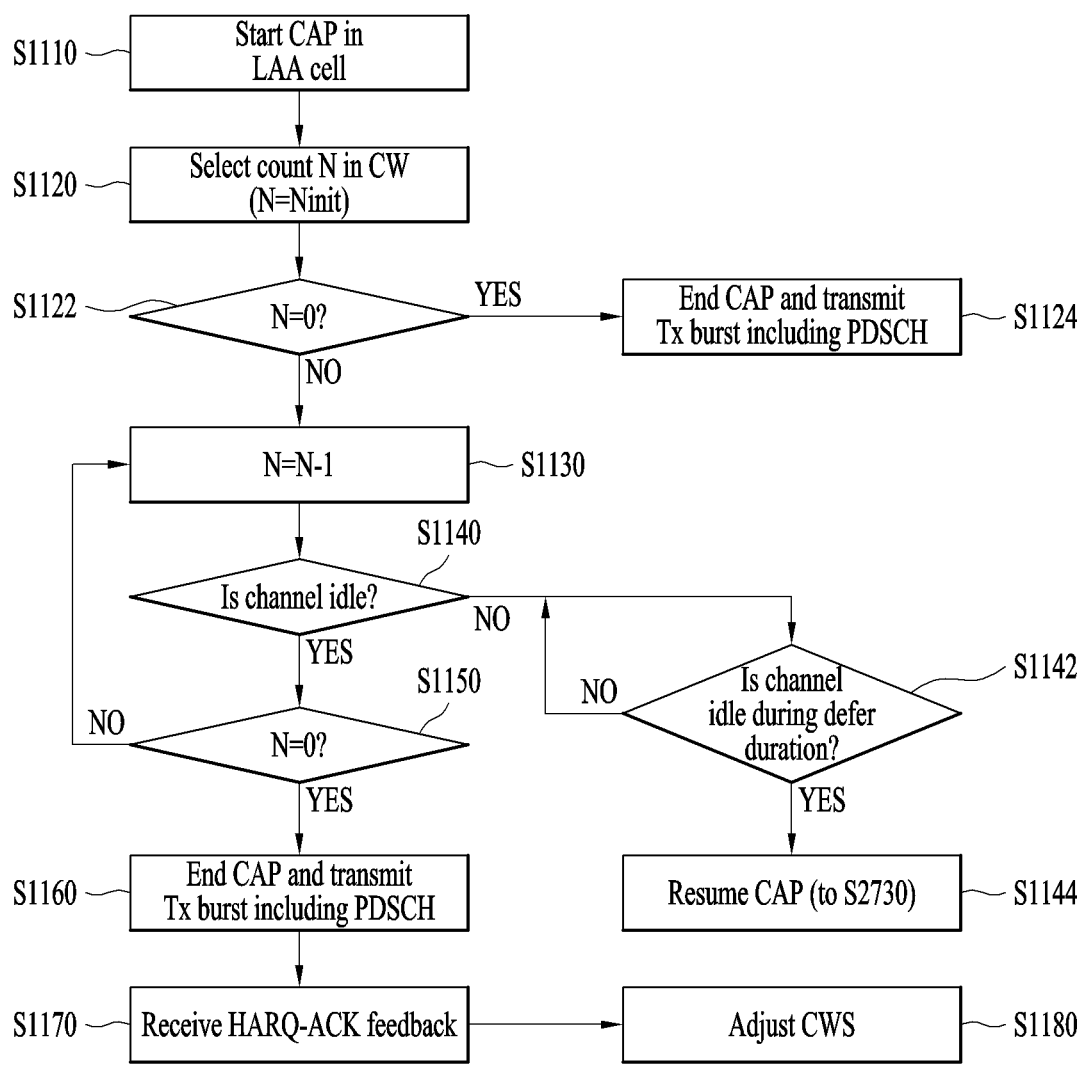
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the LIE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a detail downlink transmission method.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, it may be difficult to always guarantee DL transmission of an eNB or UL transmission of a UE on an unlicensed. Hence, a UE operating on the unlicensed band may maintain access with a different cell operating on a licensed band to stably control mobility, RRM (radio resource management) function, and the like. In the present invention, for clarity, a cell accessed by a UE on the unlicensed band is referred to as a U-Scell (or LAA Scell) and a cell accessed by the UE on the licensed band is referred to as a Pcell. As mentioned in the foregoing description, a scheme of performing data transmission/reception on the unlicensed band using a combination with the licensed band is generally called LAA (licensed assisted access).

TABLE 2

| Channel Access Priority Class (p) | $m_p$ | $CW_{min,p}$ | $CW_{max,p}$ | $T_{mcot,p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

Figure 12:
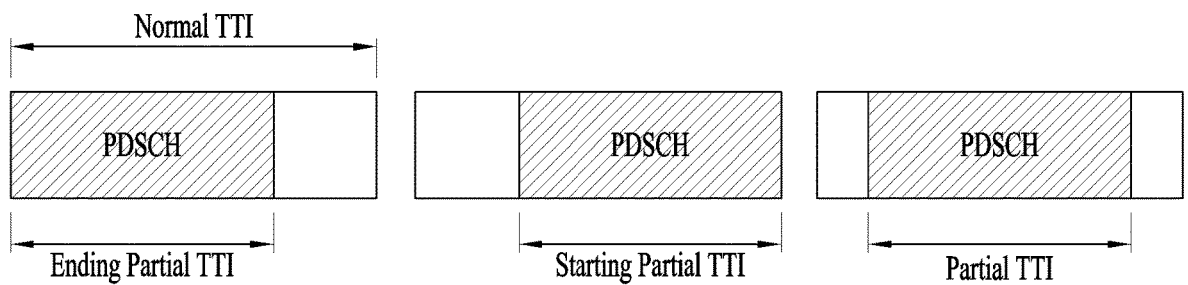
FIG. 12 is a diagram illustrating a partial TTI or a partial subframe applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap)

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

In the following, the present invention proposes a method for a base station to indicate LBT parameters for UL transmission to a UE and a method for the UE to interpret LBT parameter signaling of the base station to minimize ambiguity between the base station and the UE.

Although the operation of the present invention is basically explained based on LTE system, the operation of the present invention can be applied to any wireless communication system performing LBT. And, although operations proposed by the present invention are explained in the aspect of CWS (or back-off counter) information or a partial TTI (or Tx gap) informed to a UE by a base station, in more general terms, the CWS (or back-off counter) information may correspond to a random LBT parameter.

3.1 Method 1

When a base station informs a UE of CWS (or backoff counter) information for transmission to be performed in a specific UL subframe, the UE can perform LBT by applying the CWS (or backoff counter) in the following situations.

(1) When signal transmission does not exist immediately before the specific UL subframe (2) When MCOT ends immediately before the specific UL subframe (3) When a value different from a CWS (or backoff counter) value, which is configured prior to the specific UL subframe, is configured (4) When a CWS (or backoff counter) value indicated to the specific UL subframe exists (i.e., if a meaningful CWS (or backoff counter) value is indicated to the specific UL subframe, LBT for performing transmission in the subframe is newly started)

If a base station involves in configuring an LBT parameter value for a UL LBT operation of a UE, it is necessary to define the timing at which the LBT parameter is utilized to the UE.

For example, assume that the base station indicates a CWS value to the UE in a UL grant for a specific PUSCH. If the UE already starts a UL transmission burst (hereinafter, UL TX burst) at the timing of transmitting the PUSCH, it is not necessary for the UE to perform new LBT by utilizing the CWS value. Hence, as a simple method, it may be able to configure the UE to resume or perform an LBT operation by applying an LBT parameter indicated prior to a UL subframe only when signal transmission does not exist immediately before the UL subframe to which an LBT parameter is indicated by the base station.

Or, when the base station intends to indicate LBT to be resumed or performed, the base station can indicate the same CWS (or backoff counter) value in UL TX burst intended by the base station. On the contrary, if the base station intends to indicate a new UL TX burst, the base station configures a different CWS (or backoff counter) value to indicate the UE to perform new LBT. Or, if the base station indicates a specific CWS (or backoff counter) value, the UE can comprehend the indication as the UE newly performs UL LBT soon.

3.2 Method 2

When a base station informs a UE of CWS (or backoff counter) information for UL LBT via a UL grant, the UE can apply the CWS (or backoff counter) information only when a UL LBT operation for starting UL signal (e.g., PUSCH) transmission indicated by the UL grant is performed.

When the base station informs the UE of a UL grant including an LBT parameter for a UL LBT operation, it is necessary not to have a mismatch between an LBT parameter value intended by the base station and an LBT parameter value actually applied by the UE. To this end, if a UL LBT procedure for starting PUSCH (or UL TX bust) transmission occurs in the conditions or situations mentioned earlier in the method 1, the UE can apply an LBT parameter indicated by the UL grant. For example, although the UE newly receives a backoff counter value at the timing of a different UL grant (e.g., UL grant 2) after the timing of a specific UL grant (e.g., UL grant 1), since a backoff counter value expected by the base station corresponds to a value indicated by the UL grant 1 in the UL LBT operation for performing PUSCH transmission corresponding to the UL grant 1, it is preferable for the UE to apply the value.

3.3. Method 3

When a base station informs a UE of CWS information for UL LBT, the UE can apply CWS information, which is determined as the most recent CWS information indicated by the base station, immediately before the UL LBT is performed.

Figure 13:
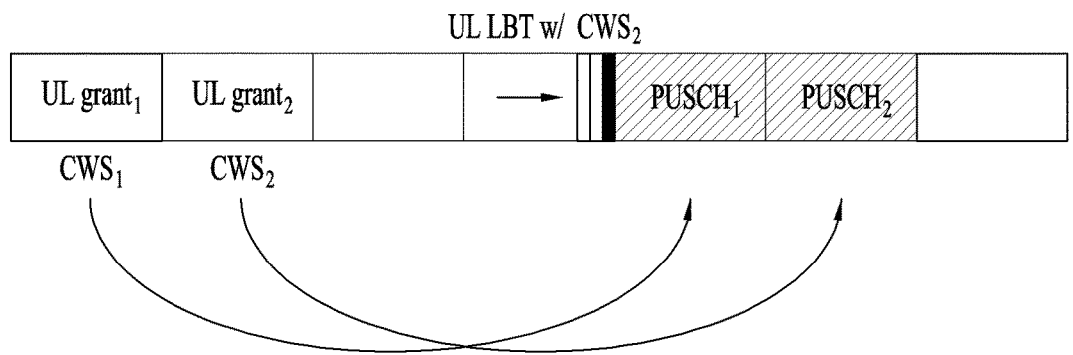
FIG. 13 is a diagram illustrating an operation of a UE that performs UL LBT by applying recent CWS information according to the present invention.

FIG. 13 is a diagram illustrating an operation of a UE that performs UL LBT by applying recent CWS information according to the present invention.

When a base station informs a UE of a UL grant including CWS information for a UL LBT operation, due to the property of LTE system, time delay between the UL grant and transmission timing of PUSCH corresponding to the UL grant may exist. Hence, the UE can receive a UL grant (or DCI) including more recent information than the CWS information indicated by the UL grant prior to the timing of transmitting the PUSCH. In this case, unlike a backoff counter value, if the base station indicates CWS information only to the UE, the base station may expect the application of the most recent CWS information rather than the application of the previously indicated CWS information of the UE at the specific timing. In other word, the base station may consider that the most recent CWS information is applied to UL LBT of the UE.

In this view point, if it is more important to reflect a recent state of a CWS, it is preferable to configure a CWS value using the most recent CWS information among CWS information which are received immediately before UL LBT is performed. For example, referring to FIG. 13, if a UE performs PUSCH transmission in an $(n+4)^{th}$ subframe in response to a UL grant received in an $n^{th}$ subframe, the UE can configure a CWS value by utilizing CWS information indicated by a UL grant, which is received in an $(n+1)^{th}$ subframe, as the most recent CWS information prior to the timing of transmitting the PUSCH. In particular, the operation above can be applied when a base station directly indicates a value of a CWS.

3.4 Method 4

When a base station informs a UE of CWS (or backoff counter) information for UL LBT, the base station can cell-specifically inform the UE of the information by utilizing common DCI or PHICH.

If the base station commonly adjusts an LBT parameter for all UEs instead of adjusting the LBT parameter according to a UE, it is preferable to forward the LBT parameter via DCI capable of being cell-commonly received by UEs (i.e., common DCI) rather than UE-specific DCI such as a UL grant. And, asynchronous HARQ is applied to UL transmission and the CWS (or backoff counter) information can be UE-commonly informed by reusing the remaining PHICH resources. In the following other proposals, the base station can inform the UE of CWS (or backoff counter) information via common DCI or PHICH.

3.5 Method 5

When a base station informs a UE of CWS (or backoff counter) information for UL LBT, if the UE fails to receive CWS (or backoff counter) information corresponding to a specific UL subframe, the UE may use a previously configured value. In other word, if the UE fails to receive CWS (or backoff counter) information corresponding to a specific UL subframe, the UE can perform UL LBT by utilizing previously configured CWS (or backoff counter) information.

In this case, the base station can indicate that the CWS (or backoff counter) information corresponding to the specific UL subframe does not exist via a specific state of a bit field included in DCI (e.g., UL grant, etc.). However, if the UE does not know a previously configured value or fails to find out the previously configured value, the UE may omit transmission in the UL subframe.

For example, in order to inform the UE of a UL TX burst intended by the base station, the base station informs the UE of an LBT parameter for a first subframe of the UL TX burst only and informs the UE of 'no LBT parameter indication' state for the remaining subframes of the UL TX burst. Then, the UE may attempt to perform transmission by performing UL LBT on the UL TX burst only when the UE receives indication such as a CWS (or backoff counter) value and the like in the first subframe of the UL TX burst intended by the base station. If the UE fails to receive a UL grant for the first subframe and receives UL grants for the subframes appearing after the first subframe, since there is no previously configured CWS (or backoff counter) value, the UE may not perform UL transmission. For example, when the base station forwards a CWS (or backoff counter) value to the UE via common DCI (e.g., UL grant) in the first subframe of the UL TX burst according to the method 4, if the UE fails to receive the common DCI in the first subframe of the UL TX burst, the UE may abandon transmission for the whole of the UL TX burst.

More generally, the UE may operate as follows for a specific UL subframe to which a CWS (or backoff counter) value is not set.

(1) If a UL signal is transmitted immediately before the specific UL subframe, the UE transmits a UL signal in the specific UL subframe as well. Otherwise, the UE does not transmit a signal in the UL subframe.

(2) If a previous LBT operation is in progress, the UE continuously performs an LBT operation.

(3) The UE autonomously configures a CWS (or backoff counter) value.

(4) The UE uses a previously configured CWS (or backoff counter) value as it is.

In the following description, a method of indicating a CWS (or backoff counter) value is explained in detail.

3.6 Method 6

When a base station informs a UE of CWS information for UL LBT, the base station can indicate one selected from the N number of CWS ranges (or a set of CWS values) to the UE via a UL grant (or DL grant).

In this case, the UE can configure a CWS value within the CWS range (or a set of CWS values) using one of operations described in the following.

(1) The UE selects a maximum value (or minimum value) within the CWS range (or set) from among CWS values configured by UL channel access priority class.

(2) If previous CWS information does not exist, the UE selects a minimum value within the CWS range (or set) from among the CWS values configured by UL channel access priority class. If previous CWS information exists, the UE selects a value equal to or smaller than a value (e.g., $2^K \ast C_{n-1} + 2^{K-1} + 2^{K-2} + \ldots + 1$) resulted from performing a specific arithmetic operation (e.g., $2 \ast C_{n-1} + 1$) K times on a previous CWS value (e.g., $C_{n-1}$) among the CWS values configured by UL channel access priority class.

For example, assume that channel access priority class of DL LBT defined in Table 2 is identically applied to UL LBT. In this case, when the base station informs the UE of CWS information for UL LBT operation of the UE, the base station can indicate a value selected from the group consisting of {3, 7, 15, 31, 63, 127, 255, 511, and 1023} to the UE. In this case, when the base station indicates a value among the 9 values in total, the base station has signaling overhead of 4 bits.

However, if a CWS value is directly indicated especially in channel access priority class 1/2 that uses two CWS values only, it may lead to unnecessary signaling overhead. Hence, it is necessary to consider a method of mitigating the signaling overhead compared to the method above. As a method, it may consider a method that the base station informs the UE of a set of CWS values rather than an accurate value of a CWS. For example, as shown in Table 3, the base station may inform the UE of a set of CWS values via signaling of a size of 3 bits.

TABLE 3

| Bits | CWS |
| --- | --- |
| 000 | {3, 15} |
| 001 | {7, 31} |
| 010 | 63 |
| 011 | 127 |
| 100 | 255 |
| 101 | 511 |
| 110 | 1023 |
| 111 | Reserved |

In this case, if channel access priority class corresponds to 1, the UE can receive such indication of CWS values as 3 and 7 as biggest value included in CWS values defined by the channel access priority class among CWS values indicated by states of '000' and '001'. If channel access priority class corresponds to 2, the UE can receive such indication of CWS values as 15 and 7 by the states of '000' and '001'.

3.7 Method 7

When a base station informs a UE of CWS information for UL LBT, the base station can indicate the N ($=2^M$) number of states for a CWS to a UE via a field of a size of M bits included in a UL grant (or DL grant). In this case, at least one state among the N number of states indicates a CWS minimum value (or a specific CWS value) (e.g., $C_0$) and the remaining states can be configured to indicate a set including a plurality of numbers.

The numbers included in the set may correspond to an accumulated count resulted from applying a specific arithmetic operation (e.g., $2 \ast C_0 + 1$) to the CWS minimum value (or specific CWS value) (or a collision occurrence accumulated count or CWS increment accumulated count).

If the base station indicates the CWS minimum value (or a specific CWS value), the UE applies the CWS minimum value to a CWS. If the base station indicates a set of arithmetic operation counts and a previous CWS value corresponds to a value resulted from applying the specific arithmetic operation to the CWS minimum value P times, the UE selects S corresponding to a minimum value equal to or greater than the P from the set of arithmetic operations indicated by the base station and configures a value resulted from applying arithmetic operation to the previous CWS value S times as a new CWS value. In this case, if the selected value is greater than a CWS maximum value defined according to the channel access priority class, the UE applies the CWS maximum value defined according to the channel access priority class.

For example, the base station can indicate values shown in Table 4 via signaling of a size of 2 bits.

TABLE 4

| Bits | CWS |
| --- | --- |
| 00 | $C_{min}$ |
| 01 | 1, 4, 7 |
| 10 | 2, 5, 8 |
| 11 | 3, 6, 9 |

In this case, if the UE receives an indication of $C_{min}$ (e.g., 3) by '00' in an $n^{th}$ subframe and receives an indication of '01' in an $(n+1)^{th}$ subframe, since a specific arithmetic operation is applied to a previous CWS value 0 time, the UE selects 1 corresponding to a minimum value equal to or greater than 0 among values indicated by '01' and configures a value (e.g., $2*C_{min}+1=7$) resulted from applying a specific arithmetic operation to the $C_{min}$ corresponding to the previous CWS value 1 time as a new CWS value.

In this case, arithmetic operation accumulated count values indicated by the single state can be designed to have a sufficient difference. For example, as shown in Table 4, it may be able to design arithmetic operation accumulated counts to have a difference as much as 3.

Figure 14:
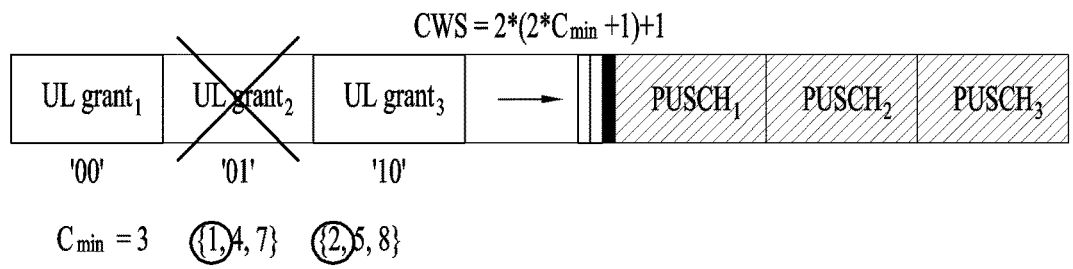
FIG. 14 is a diagram illustrating an example according to a method 7 of the present invention.

FIG. 14 is a diagram illustrating an example according to a method 7 of the present invention.

As shown in FIG. 14, although a base station indicates CWS information in an $n^{th}$ subframe, an $(n+1)^{th}$ subframe, and an $(n+2)^{th}$ subframe, a UE can receive the CWS information in the $n^{th}$ subframe and the $(n+2)^{th}$ subframe only. In this case, although CWS information indicates the UE to increase a CWS in the $(n+1)^{th}$ subframe, the UE may fail to receive the CWS information. The UE receives an indication of $C_{min}$ (e.g., 3) by '00' in the $n^{th}$ subframe and may receive an indication of '10' in the $(n+2)^{th}$ subframe. In this case, since a specific arithmetic operation is applied to a previous CWS value 0 time, the UE selects 2 corresponding to a minimum value equal to or greater than 0 among values indicated by '10' and configures a value (e.g., $2*(2*C_{min}+1)+1=15$) resulted from applying a specific arithmetic operation to the $C_{min}$ corresponding to the previous CWS value 2 time as a new CWS value. In particular, the UE may not be affected by the CWS information which is not received in the $(n+1)^{th}$ subframe.

However, if the UE consecutively fails to receive a CWS indicated by the base station 3 times or more, a CWS value mismatch problem may occur between the UE and the base station.

3.8 Method 8

When a base station informs a UE of CWS information for UL LBT, the base station indicates the N ($=2^M$) number of states for a CWS via a field of a size of M bits within a UL grant (or DL grant), at least one of the N number of states indicates a CWS minimum value (or a specific CWS value), and each of the remaining states can indicate a set including a plurality of CWS values.

If the base station indicates the CWS minimum value (or specific CWS value), the UE applies the indicated value to a CWS. If the base station indicates a set of CWS values, the UE selects a minimum value equal to or greater than a value resulted from applying a specific arithmetic operation to a previous CWS value P times and configures the selected value as a CWS value. In this case, if the selected value is greater than a CWS maximum value which is defined according to channel access priority class, the UE applies the CWS maximum value defined according to the channel access priority class.

As a modified example of the method 7, the base station can indicate a set including a plurality of CWS values instead of an arithmetic operation count. For example, the base station can indicate values shown in Table 5 in the following via signaling of a size of 2 bits.

TABLE 5

| Bits | CWS |
| --- | --- |
| 00 | $C_{min}$ (=3) |
| 01 | 7, 63, 511 |
| 10 | 15, 127, 1023 |
| 11 | 31, 255 |

In this case, if $C_{min}$ (=3) is indicated to the UE by '00' in an $n^{th}$ subframe and '01' is indicated to the UE in an $(n+1)^{th}$ subframe, the UE selects 7 corresponding to a minimum value in a set indicated by '01' and the minimum value equal to or greater than a value resulted from applying a specific arithmetic operation to a previous CWS value P (=1) time and can configures 7 as a CWS value.

Preferably, similar to the aforementioned method 6, arithmetic operation accumulated count values indicated by a single state can be designed to have a sufficient difference.

As mentioned earlier in FIG. 14, although a base station indicates CWS information in an $n^{th}$ subframe, an $(n+1)^{th}$ subframe, and an $(n+2)^{th}$ subframe, a UE can receive the CWS information in the $n^{th}$ subframe and the $(n+2)^{th}$ subframe only. In this case, if the UE receives an indication of $C_{min}$ (=3) by '00' in the $n^{th}$ subframe and receives an indication of '10' in the $(n+2)^{th}$ subframe, the UE may select 15 corresponding to a minimum value in a set indicated by '10' and the minimum value equal to or greater than a value resulted from applying a specific arithmetic operation to a previous CWS value 1 time as a new CWS value.

In addition, the base station can configure a single state of a bit field indicating CWS information to indicate an LBT operation to which a CWS is not applied. For example, if the state of the bit field indicating the CWS information corresponds to '00', the UE may be able to comprehend the state as a meaning that it is necessary for the UE to perform a fast UL LBT operation that performs CCA on a single CCA slot only.

3.9 Method 9

When a base station informs a UE of CWS information, the base station can indicate the CWS information to the UE by jointly coding the CWS information with a different LBT parameter (e.g., channel access priority class or MCOT).

For example, the base station may be able to reuse the channel access priority class for DL defined in the release-13 LAA system mentioned earlier in Table 1 and the LBT parameters for UL. In this case, in order for the base station to indicate both channel access priority class and a CWS value to the UE, the base station can indicate the two values by performing joint coding on the two values. For example, as shown in Table 6, the base station can indicate priority class and a CWS to the UE via signaling of a size of 4 bits.

TABLE 6

| Bits | {Class, CWS} | Bits | {Class, CWS} |
| --- | --- | --- | --- |
| 0000 | {1, 3} | 1000 | {4, 31} |
| 0001 | {1, 7} | 1001 | {4, 63} |
| 0010 | {2, 7} | 1010 | {4, 127} |
| 0011 | {2, 15} | 1011 | {4, 255} |
| 0100 | {3, 15} | 1100 | {4, 511} |
| 0101 | {3, 31} | 1101 | {4, 1023} |
| 0110 | {3, 63} | 1110 | Reserved |
| 0111 | {4, 15} | 1111 | Reserved |

3.10 Method 10

A base station and a UE can generate a backoff counter value using a scheme promised between the base station and the UE. More specifically, the UE can configure a backoff counter value by an output value of a function that receives a subframe index (or a slot index) or PCI (physical cell identity) as an input.

In this case, it may be able to apply a value to which Modulo calculation is applied to a final backoff counter value as a CWS to be actually applied to an output value of a specific function commonly applied to a random CWS.

When the base station intends to match backoff counter values between UEs to perform FDM and MU-MIMO operation, although the base station does not directly indicate a backoff counter value, if a scheme of generating a common backoff counter value is configured between the UEs, the base station can match a backoff counter value between the UEs. In particular, the UEs can generate a backoff counter value by utilizing a function that uses a UL subframe index, PCI, and the like as an input parameter.

In addition, the UEs usually use UE-specific ID information (e.g., RNTI (Radio Network Temporary Identifier)) as a function input value for generating a backoff counter. The UEs may exclude the UE-specific ID information from an input parameter according to the indication of the base station. Or, the base station may additionally indicate a random seed value to a UE to indicate the UE to use the random seed value as the input value of the function.

3.11 Method 11

When a base station informs a UE of information on whether or not a partial TTI (or TX gap) is applied to a specific UL subframe and information on a configuration form, the base station informs the UE of the number of PRBs (physical resource blocks) (e.g., $N_{PRB,Normal}$) and MCS index ($I_{MCS}$) as TBS (transport block size) information on a normal TTI. The UE can perform scaling on the number of PRBs (e.g., $N_{PRB, Partial}$) for determining TBS in a partial TTI in proportion to a length of the partial TTI (or TX gap).

In this case, the UE is able to know a TBS value corresponding to a combination of the number of PRBs and an MCS index via TBS table.

For example, when the number of symbols of a normal TTI corresponds to $N_1$ and the number of symbols of a partial TTI corresponds to $N_2$, as shown in equation 1, the UE can define $N_{PRB,Partial}$ for determining TBS in the partial TTI by a value resulted from performing scaling on the number of PRBs $N_{PRB,Normal}$ in the normal TTI.

$$N_{PRB, Partial} = \max\left\{\left\lfloor N_{PRB, Partial} \times \frac{N_2}{N_1}\right\rfloor, 1\right\} \qquad \text{[Equation 1]}$$

Or, if a length of a partial TTI is included in a specific range, it may be able to identically apply the $N_{PRB, Partial}$ using a value resulted from scaling the $N_{PRB, Normal}$ with a prescribed ratio. For example, it may be able to define the M number of sets (e.g., $S_1, S_2, \ldots, S_M$) to which the length of the partial TTI belongs thereto. When a specific partial TTI length (e.g., 1) belongs to an $m^{th}$ set (e.g., $S_m$), as shown in equation 2, it may be able to calculate the $N_{PRB, Partial}$ by applying a scaling ratio $R_m$.

$$N_{PRB, Partial} = \max\{\lfloor N_{PRB, Partial} \times R_m \rfloor, 1\} \text{ if } l \in S_m \qquad \text{[Equation 2]}$$

More specifically, if a partial TTI length applied to a UL subframe is equal to or less than 6 symbols, it may apply 0.375 as the $R_m$. If a partial TTI length applied to a UL subframe is equal to or greater than 7 symbols, it may apply 0.75 as the $R_m$.

3.12 Method 12

A base station can inform a UE of LST parameter information on a specific UL subframe (e.g., information on whether or not partial TTI (or TX gap) is applied and a configuration form, a CWS. a backoff counter, etc.) and information on whether or not rate-matching/puncturing is performed on an SRS symbol via common DCI (or DL grant or PHICH). In this case, the timing of a UL subframe to which the information is applied can be relatively defined on the basis of the timing at which a DL subframe indicated by the information is received. Or, the timing of the UL subframe can be indicated via the common DCI (or DL grant or PHICH).

Release-14 eLAA system considers performing UL transmission without a UL grant (e.g., PUCCH, etc.). Hence, it may consider an operation that a control signal rather than the UL grant indicates an LBT parameter for UL LBT via common DCI included in a DL subframe. In this case, a UL subframe to which LBT parameter information, which is included in common DCI transmitted in an $n^{th}$ DL subframe, is to be applied can be determined by an $(n+k)^{th}$ UL subframe corresponding to the relative timing promised in advance between a base station and a UE. Or, a UL subframe to which LBT parameter information included in the common DCI is to be applied can be indicated via the common DCI.

In addition, when PUCCH transmission is performed in a U-cell, the base station can inform a UE of PUCCH (or ACK/NACK) transmission timing via common DCI (on PDSCH transmitted in a DL subframe) in consideration of a flexible DL/UL structure.

3.13 Method 13

It may set a limit on the application of a starting partial subframe for a subframe configured as an ending partial subframe (ending partial TTI) or a subframe (to which ending TX gap is applied) (according to an LBT result).

(1) A length of a starting partial subframe applied to the subframe is restricted by a value relatively smaller than a length of a starting partial subframe applied to the whole of subframes.

(2) A starting partial subframe is not applied to the subframe.

For example, a base station can indicate whether or not an ending partial subframe is applied to a specific UL subframe to a UE for UL transmission. At the same time, the UE may apply a starting partial subframe to the specific subframe to change a start point according to a UL LBT result.

In this case, when the UE applies a starting partial subframe to a full TTI, if the UE is allowed to start the starting partial subframe at any random timing, symbols for transmitting data will be insufficient. Hence, the base station sets a limit on the start point of the starting partial subframe of the UE in advance to secure symbols sufficient for transmitting data.

However, when a specific UL subframe is designated as an ending partial subframe, if the UE applies a starting partial subframe to the specific UL subframe, the number of symbols for transmitting data can be considerably reduced. Hence, the method 13 proposes a method of configuring a length of a starting partial subframe (i.e., a length of a TX gap applied from a first symbol of a subframe) applied to an ending partial subframe to be short to secure the minimum number of data symbols for the ending partial subframe. Or, the method 13 proposes a method of not applying a starting partial subframe to a subframe designated as an ending partial subframe. In the foregoing description, although a UL transmission procedure has been explained as an example, the proposed method can also be applied to both a DL transmission subframe and a UL transmission subframe.

The method 13 is more generally described in the following. If a UE fails to perform transmission from a subframe boundary in an ending partial subframe, the UE does not perform an additional UL LBT operation in the ending partial subframe.

3.14 Method 14

When a UE transmits UL TX burst, it may be able to set a limit on a maximum value of a length of a UL reservation signal in proportion to a (remaining) length of the UL TX burst to be transmitted.

In this case, a base station can configure a ratio of the UL TX burst to be transmitted to the UL reservation signal.

For example, assume that the UE transmits a UL TX burst including 4 subframes with MCOT of 4 ms and a length of a maximum value of a UL reservation signal is restricted to 1 ms. If the UE succeeds in UL LBT prior to a first subframe of the UL TX burst, overhead of the UL reservation signal may become maximum 25%. On the contrary, if the UE succeeds in UL LBT prior to a fourth subframe of the UL TX burst, overhead of the UL reservation signal may increase up to maximum 100% compared to data.

In particular, if the overhead of the UL reservation signal increases compared to data, efficiency of channel use in an unlicensed band cell can be degraded. Hence, preferably, a maximum value of the length of the UL reservation signal can be configured in proportion to a remaining length of the UL TX burst to be transmitted by the UE. In this case, the base station can indicate a ratio of the length of the UL TX burst to the maximum value of the length of the UL reservation signal via higher layer signaling such as RRC.

Meanwhile, in LTE Release-13 system according to an embodiment of the present invention, as shown in FIG. 16, a method of configuring an energy detection threshold for an LBT operation at the time of performing DL transmission is proposed.

In this case, according to the present invention, an energy detection threshold for UL LBT of a UE can be configured in a form similar to FIG. 16. However, since the UE is unable to know regulation information of a region to which the UE belongs, if a configuration method (e.g., a calculation equation of an energy detection threshold, etc.) of an energy detection threshold is differently defined according to the regulation, the UE is unable to determine a configuration method of an energy detection threshold to be applied. In order to solve the problem above, the present invention proposes a method described in the following.

For reference, in the following description, although such terms as an energy detection threshold and an energy threshold are used in a manner of being mixed, those skilled in the art can easily understand that the two terms mean the same technical configuration.

3.15 Method 15

A base station can inform a UE of a value of an energy threshold for UL LBT operation using one of methods described in the following.

(1) An energy threshold to be used by the UE is indicated via higher layer signaling such as RRC.

(2) An energy threshold to be used by the UE is indicated via a dynamic control signal such as DCI.

In this case, the base station can inform the UE of the energy threshold according to a channel.

As mentioned in the foregoing description, the base station can indicate a direct energy threshold to the UE. Since the method enables the base station, which knows a regulation for a corresponding region well, to select an energy threshold, it is able to solve a determination problem of the UE. Moreover, when the base station intends to apply a different energy threshold to UL transmission of the UE, the method can be helpful.

3.16 Method 16

If it is able to change an equation for calculating an energy threshold for predefined UL LBT according to regulation of a region, a base station can forward information described in the following to a UE.

(1) Regulation information of a region to which the UE currently belongs.

(2) Energy threshold equation information capable of being applied by a UE. For example, when there are an equation A and an equation B as equations for calculating an energy threshold, the base station can indicate the equation A or the equation B to the UE.

The aforementioned method 15 has a merit in that the base station, which knows regulation of a region, directly indicates an energy threshold for a UL LBT operation. However, the method 15 has a demerit in that it is unable to configure an energy threshold in consideration of transmit power of the UE, when $PC_{MAX,c}$ of the UE is applied using $P_{TX}$ value shown in FIG. 16.

Hence, in the method 16, a method of indicating a method of calculating an energy threshold (e.g., energy threshold calculation equation) to be applied by a UE is proposed instead of a method for a base station to directly indicate an energy threshold. For example, the base station indicates the UE to apply equation 3 in a region where Wi-Fi is restricted and can indicate the UE to apply equation 4 in a region where Wi-Fi is used.

$$X_{Thresh\_max} = \min \begin{cases} T_{max} + 10 \text{ dB}, \\ X_r \end{cases} \qquad \text{[Equation 3]}$$

$$X_{Thresh\_max} = \min \begin{cases} -72 \text{ dBm (20 MHz)}, \\ \min \begin{cases} T_{max}, \\ T_{max} - T_A + (P_H - P_{TX}) \end{cases} \end{cases} \qquad \text{[Equation 4]}$$

In this case, the base station can inform the UE of values such as $T_{max}$, $X_r$, $T_A$, $P_H$, $P_{TX}$, etc. applied in the equation 3 and the equation 4. In this case, the $T_{max}$ corresponds to a reference energy detection threshold value according to a bandwidth, the $X_r$ corresponds to a maximum energy detection threshold value defined by regulation, the $T_A$ corresponds to a weight for an energy detection threshold value according to a physical channel, and the $P_H$ corresponds to a reference power value for an eNB on an unlicensed band (or specific carrier).

More specifically, the base station transmits information indicating an equation of calculating an energy detection threshold value for a UL LBT operation to the UE according to the method 15 and the method 16. In this case, the information can indicate one of two equations based on whether or not an unlicensed band is shared with a different communication technology (e.g., Wi-Fi).

The information can be transmitted via higher layer signaling such as RRC or a dynamic control signal such as DCI.

Having received the information, the UE performs UL LBT based on an equation indicated by the information and can transmit an UL signal according to a result of the UL LBT.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB informs a UE of information on whether to apply the proposed methods (or, information on rules of the proposed methods) via a predefined signal (e.g., physical layer signal or higher layer signal).

4. Device Configuration

Figure 15:
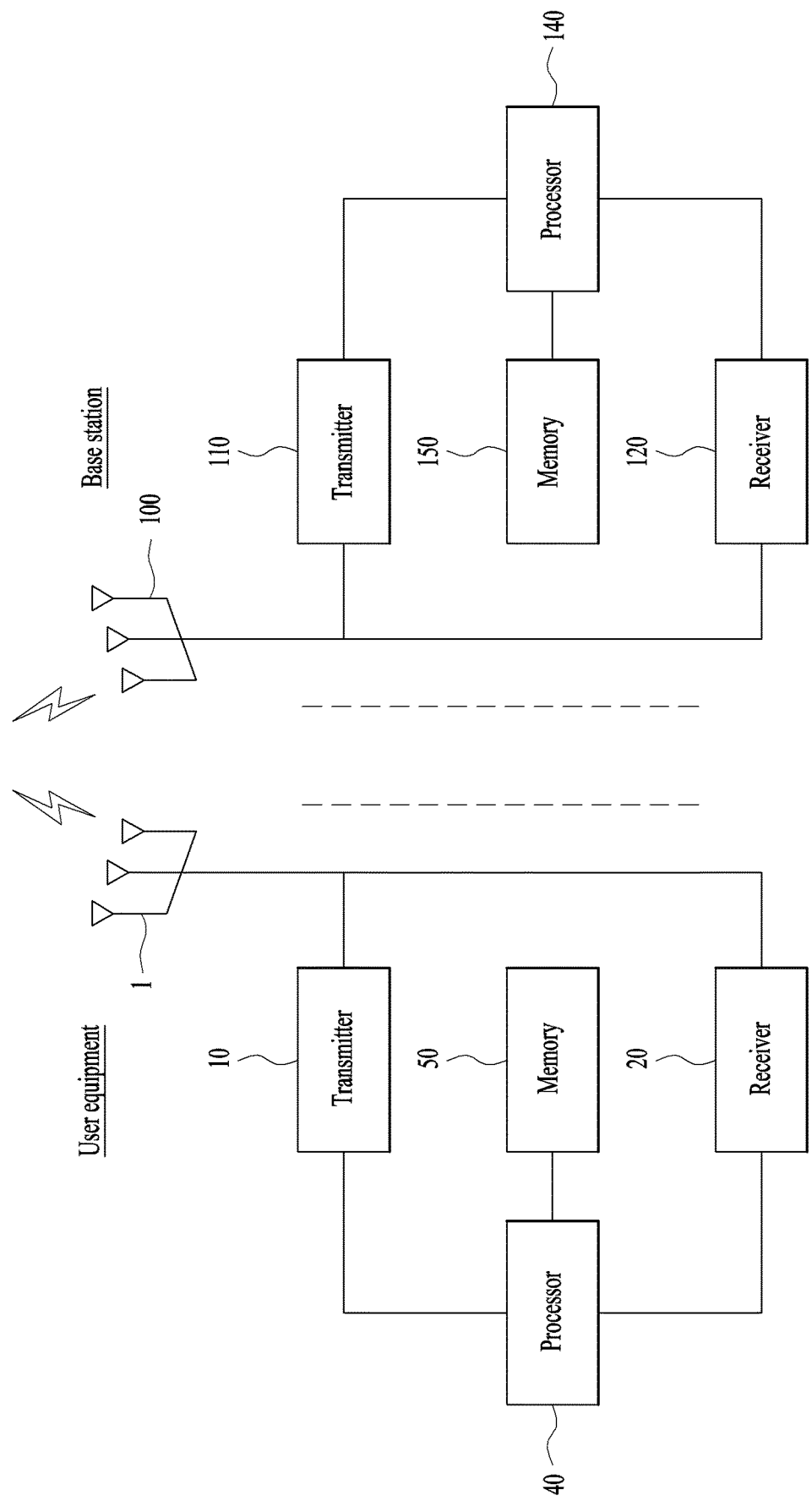
FIG. 15 is a diagram illustrating configurations of a UE and a base station in which proposed embodiments are implementable.

FIG. 15 is a diagram illustrating configurations of a UE and a base station capable of being implemented by the embodiments proposed in the present invention. The UE and the base station shown in FIG. 15 operate to implement the embodiments of a method of transmitting and receiving a signal between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE receives first DL control information indicating whether a type of scheduling uplink signal transmission for one or more subframes corresponds to scheduling of a first type or scheduling of a second type from the base station via the processor 40. If the first DL control information indicates the scheduling of the first type, the UE can be configured to transmit an uplink signal in one or more subframes which are configured on the basis of the reception timing of the first DL control information. If the first DL control information indicates the scheduling of the second type, the UE can be configured to receive second DL control information indicating UL signal transmission for one or more subframes from the base station and transmit the uplink signal in one or more subframes which are configured on the basis of the reception timing of the second DL control information.

The base station transmits first DL control information indicating whether a type of scheduling uplink signal transmission for one or more subframes corresponds to scheduling of a first type or scheduling of a second type to the UE via the processor 140. If the first DL control information indicates the scheduling of the first type, the base station can be configured to receive an uplink signal in one or more subframes which are configured on the basis of the reception timing of the first DL control information. If the first DL control information indicates the scheduling of the second type, the base station can be configured to transmit second DL control information indicating UL signal transmission for one or more subframes to the UE and receive the uplink signal in one or more subframes which are configured on the basis of the reception timing of the second DL control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method of transmitting an uplink signal by a user equipment (UE) to a base station in a wireless communication system supporting an unlicensed band, the method comprising:
receiving from the base station, information indicating an energy detection threshold for an uplink transmission in the unlicensed band,
wherein the information indicates one of:
a first equation for a case where the unlicensed band is not shared with a different communication technology, or
a second equation for a case where the unlicensed band is shared with the different communication technology;
determining an actual energy detection threshold value for the uplink transmission using the first equation or the second equation based on the information; and
transmitting the uplink signal based on a channel access procedure (CAP) for the uplink transmission in the unlicensed band, based on the determined actual energy detection threshold value,
wherein the actual energy detection threshold value is determined based on a first maximum energy detection threshold value satisfying the first equation based on that the information indicates the first equation, and
wherein the actual energy detection threshold value is determined based on a second maximum energy detection threshold value satisfying the second equation based on that the information indicates the second equation,
wherein the first equation is determined based on a following equation, $$X_{Thresh\_max} = \min\left\{ \begin{array}{l} T_{max} + 10 \text{ dB,} \\ X_r \end{array} \right\} \quad \text{[Equation]}$$

where $X_{Thresh\_max}$ denotes the first maximum energy detection threshold value, $T_{max}$ denotes a reference energy detection threshold value related to a bandwidth, and $X_r$ denotes a maximum energy detection threshold defined by regulatory requirements, and
wherein the second equation is determined based on a following equation, $$X_{Thresh\_max} = \max\left\{ \begin{array}{l} -72 \text{ dBm (20 MHz),} \\ \min\left\{ \begin{array}{l} T_{max.} \\ T_{max} - T_A + (P_H - P_{TX}) \end{array} \right\} \end{array} \right\} \quad \text{[Equation]}$$

where $X_{Thresh\_max}$ denotes the second maximum energy detection threshold value, $T_{max}$ denotes the reference energy detection threshold value related to the bandwidth, $T_A$ denotes a weight for an energy detection threshold value according to a physical channel, $P_H$ denotes a reference power value for the base station on the unlicensed band, and $P_{TX}$ corresponds to a configured maximum UE output power for the unlicensed band.

2. The method of claim 1, wherein the different communication technology contains a Wi-Fi communication technology.

3. A method of receiving an uplink signal by a base station from a user equipment (UE) in a wireless communication system supporting an unlicensed band, the method comprising;
transmitting to the UE, information indicating an energy detection threshold for an uplink transmission in the unlicensed band,
wherein the information indicates one of:
a first equation for a case where e unlicensed band is not shared with a different communication technology, or
a second equation for a case where the unlicensed band is shared with the different communication technology; and
receiving from the UE, the uplink signal transmitted based on the information via the unlicensed band,
wherein the first equation is determined based on a following equation, $$X_{Thresh\_max} = \min\left\{ \begin{array}{l} T_{max} + 10 \text{ dB,} \\ X_r \end{array} \right\} \quad \text{[Equation]}$$

where $X_{Thresh\_max}$ denotes a first maximum energy detection threshold value, $T_{max}$ denotes a reference energy detection threshold value related to a bandwidth, and $X_r$ denotes a maximum energy detection threshold defined by regulatory requirements, and
wherein the second equation is determined based on a following equation, $$X_{Thresh\_max} = \max\left\{ \begin{array}{l} -72 \text{ dBm (20 MHz),} \\ \min\left\{ \begin{array}{l} T_{max.} \\ T_{max} - T_A + (P_H - P_{TX}) \end{array} \right\} \end{array} \right\} \quad \text{[Equation]}$$

where $X_{Thresh\_max}$ denotes a second maximum energy detection threshold value, $T_{max}$ denotes the reference energy detection threshold value related to the bandwidth, $T_A$ denotes a weight for an energy detection threshold value according to a physical channel, $P_H$ denotes a reference power value for the base station on the unlicensed band, and $P_{TX}$ corresponds to a configured maximum UE output power for the unlicensed band.

4. The method of claim 3, wherein the different communication technology contains a Wi-Fi communication technology.

5. A user equipment (UE) for transmitting an uplink signal to a base station in a wireless communication system supporting an unlicensed band, the UE comprising:
a receiver;
a transmitter; and
a processor operatively coupled with the receiver and the transmitter,
wherein the processor is configured to:
receive from the base station, information indicating an energy detection threshold for an uplink transmission in the unlicensed band, wherein the information indicates one of:
- a first equation for a case where the unlicensed band is not shared with a different communication technology, or
- a second equation for a case where the unlicensed band is shared with the different communication technology;

determine an actual energy detection threshold value for the uplink transmission using the first equation or the second equation based on the information; and transmit the uplink signal based on a channel access procedure (CAP) for the uplink transmission in the unlicensed band, based on the determined actual energy detection threshold value, wherein the actual energy detection threshold value is determined based on a first maximum energy detection threshold value satisfying the first equation based on that the information indicates the first equation, and, wherein the actual energy detection threshold value is determined based on a second maximum energy detection threshold value satisfying the second equation based on that the information indicates the second equation, wherein the first equation is determined based on a following equation, $$X_{Thresh\_max} = \min\left\{\begin{array}{l} T_{max} + 10 \text{ dB,} \\ X_r \end{array}\right\} \quad \text{[Equation]}$$

where $X_{Thresh\_max}$ denotes the first maximum energy detection threshold value, $T_{max}$ denotes a reference energy detection threshold value related to a bandwidth, and $X_r$ denotes a maximum energy detection threshold defined by regulatory requirements, and wherein the second equation is determined based on a following equation, $$X_{Thresh\_max} = \max\left\{\begin{array}{l} -72 \text{ dBm (20 MHz),} \\ \min\left\{\begin{array}{l} T_{max.} \\ T_{max} - T_A + (P_H - P_{TX}) \end{array}\right\} \end{array}\right\} \quad \text{[Equation]}$$

where $X_{Thresh\_max}$ denotes the second maximum energy detection threshold value, $T_{max}$ denotes the reference energy detection threshold value related to the bandwidth, $T_A$ denotes a weight for an energy detection threshold value according to a physical channel, $P_H$ denotes a reference power value for the base station on the unlicensed band, and $P_{TX}$ corresponds to a configured maximum output power for the unlicensed band.

6. A base station for receiving an uplink signal from a user equipment (UE) in a wireless communication system supporting an unlicensed band, the base station comprising:
- a receiver;
- a transmitter; and
- a processor operatively coupled with the receiver and the transmitter, wherein the processor is configured to:

transmit to the UE, information indicating an energy detection threshold for an uplink transmission in the unlicensed band, wherein the information indicates one of:
- a first equation for a case where the unlicensed band is not shared with a different communication technology, based on a determination that the unlicensed band is not shared with the different communication technology, or
- a second equation for a case where the unlicensed band is shared with the different communication technology, based on a determination that the unlicensed band is shared with the different communication technology; and receive from the UE, the uplink signal transmitted based on the information via the unlicensed band, wherein the first equation is determined based on a following equation, $$X_{Thresh\_max} = \min\left\{\begin{array}{l} T_{max} + 10 \text{ dB,} \\ X_r \end{array}\right\} \quad \text{[Equation]}$$

where $X_{Thresh\_max}$ denotes a first maximum energy detection threshold value, $T_{max}$ denotes a reference energy detection threshold value related to a bandwidth, and $X_r$ denotes a maximum energy detection threshold defined by regulatory requirements, and wherein the second equation is determined based on a following equation, $$X_{Thresh\_max} = \max\left\{\begin{array}{l} -72 \text{ dBm (20 MHz),} \\ \min\left\{\begin{array}{l} T_{max.} \\ T_{max} - T_A + (P_H - P_{TX}) \end{array}\right\} \end{array}\right\} \quad \text{[Equation]}$$

where $X_{Thresh\_max}$ denotes the a second maximum energy detection threshold value, $T_{max}$ denotes the reference energy detection threshold value related to the bandwidth, $T_A$ denotes a weight for an energy detection threshold value according to a physical channel, $P_H$ denotes a reference power value for the base station on the unlicensed band, and $P_{TX}$ corresponds to a configured maximum UE output power for the unlicensed band.

* * * * *